(12) United States Patent
Mochizuki (10) Patent No.: US 6,463,539 B1
(45) Date of Patent: Oct. 8, 2002

(54) MANAGING SYSTEM FOR REPRODUCING INFORMATION COMPOSED OF INFORMATION RECORDING MEDIUM, MANAGING MEDIUM, AND REPRODUCTION METHOD AND APPARATUS METHOD THEREFOR

(75) Inventor: Masaki Mochizuki, Yokohama (JP)

(73) Assignee: Victor Company of Japan, Ltd., Kanagawa-ken (JP)

( * ) Notice: Subject to any disclaimer, the term of this patent is extended or adjusted under 35 U.S.C. 154(b) by 0 days.

(21) Appl. No.: 09/162,863

(22) Filed: Sep. 29, 1998

(30) Foreign Application Priority Data

Sep. 30, 1997 (JP) .............................. 9-284352

(51) Int. Cl.<sup>7</sup> ............................ H04L 9/00; G06F 12/14
(52) U.S. Cl. .......................... 713/193; 705/57; 380/201
(58) Field of Search .............................. 705/51, 52, 57, 705/56; 713/193; 380/201, 202, 203, 227, 228, 229, 230, 231, 232, 233

(56) References Cited

U.S. PATENT DOCUMENTS

| 5,737,415 | * | 4/1998 | Akiyama et al. | 705/53 |
| 5,787,061 | * | 7/1998 | Tsuchiya et al. | 369/44.29 |
| 5,822,291 | * | 10/1998 | Brindze et al. | 369/94 |
| 5,963,536 | * | 10/1999 | Vasic et al. | 369/275.3 |

FOREIGN PATENT DOCUMENTS

| JP | 7-319572 | 12/1995 |
| JP | 8-54952 | 2/1996 |
| JP | 9-44993 | 2/1997 |
| JP | 9-115241 | 5/1997 |
| JP | 9-251714 | 9/1997 |

* cited by examiner

Primary Examiner—Matthew Smithers
(74) Attorney, Agent, or Firm—Anderson Kill & Olick; Eugene Lieberstein; Michael N. Meller (57) ABSTRACT

A user 11 loads a disc 13a and an IC card 16 into a reproduction apparatus 26. A reproduction managing information 14 and a reproduction permitting information 18 are read out from the disc 13a and the IC card 16 respectively. In the reproduction apparatus 26, the read out respective reproduction managing information 14 and reproduction permitting information 18 are checked and judged whether a reproduction is permitted or not. In case that the reproduction is permitted, a software information 12 in the disc is reproduced and a utilization information in the IC card 16 is detected at a same time. The utilization information 19 is recorded on the IC card 16 when the reproduction is completed. In a rental shop 28, the utilization information 19 is read out from the IC card 16 when the disc is returned to the rental shop 28 and an amount of rental fee to be charged to a user is calculated in response to the utilization information 19. The user 11 just pays the rental fee in response to the utilization of the software information.

16 Claims, 4 Drawing Sheets

MANAGING SYSTEM FOR REPRODUCING INFORMATION COMPOSED OF INFORMATION RECORDING MEDIUM, MANAGING MEDIUM, AND REPRODUCTION METHOD AND APPARATUS METHOD THEREFOR

BACKGROUND OF THE INVENTION

1. Field of the Invention

The present invention relates to a managing system for reproducing information including information recording medium, managing medium, and, a reproduction method and an apparatus therefor, and particularly relates to preventing information from illegal duplication or copy and to improving utilization technology of information contained in a medium.

2. Description of the Related Art

In a disc package medium such as a CD, all program information contained in a disc is disclosed to an owner of the disc, that is, the owner of the disc can utilize all program information contained in the disc when the owner possesses the disc. A price of a disc is generally determined in consideration of all the information contained in the disc, therefore a consumer pays such a price for purchasing the disc in the current distribution system, in other word, a consumer pays a virtually fixed price for a "possession" of the information contained in the disc.

There provided a rental business of package medium such as a CD so as to utilize information by renting a CD for a limited period. A rental fee is determined in the above mentioned distribution system based on the initial purchasing price of the package medium and a rental term. The rental fee is also determined for all information contained in the disc. In case of a rental business, a rental fee par one package medium is determined at a rather high price since the fee is calculated from an assumption that the information contained in one package medium are fully utilized by many users. Therefore, an initial purchasing price of a package medium is very expensive at a rental shop so that a rental fee determined from the initial purchasing price becomes high.

On the other hand, a disc itself can be manufactured at an extremely low cost. Therefore, the price paid for a disc is substantially equal to a value for quality and quantity of information contained in the disc. In the current distribution system as such that a consumer pays a certain price for a "possession" of information, the consumer is obliged to pay a total cost of the information contained in the disc although the consumer does not want all of such information. In other words, manufacturers of discs are obliged to manufacture a wide variety of discs in their contents to meet a wide variety of demands by consumers so as to meet a reasonable price for quality and quantity of information. The above mentioned distribution system is not only unfavorable to the consumers but also increases cost and complexity of distribution for manufacturers.

In contrast with the above mentioned distribution system, a so called "super distribution system" is conceivable. The "super distribution system" is a system in which "utilization" of information not for a "possession" of information is paid. According to the "super distribution system", a consumer just pays for the utilized information. The unfavorable deal in the above mentioned distribution system with a "possession" of information being paid for is dissolved by the "super distribution system" and it is considered to be a more rational system. In the "super distribution system", a utilization state of program information and information of limitation of the utilization are transmitted to a managing system through a communication network.

Figure 1:
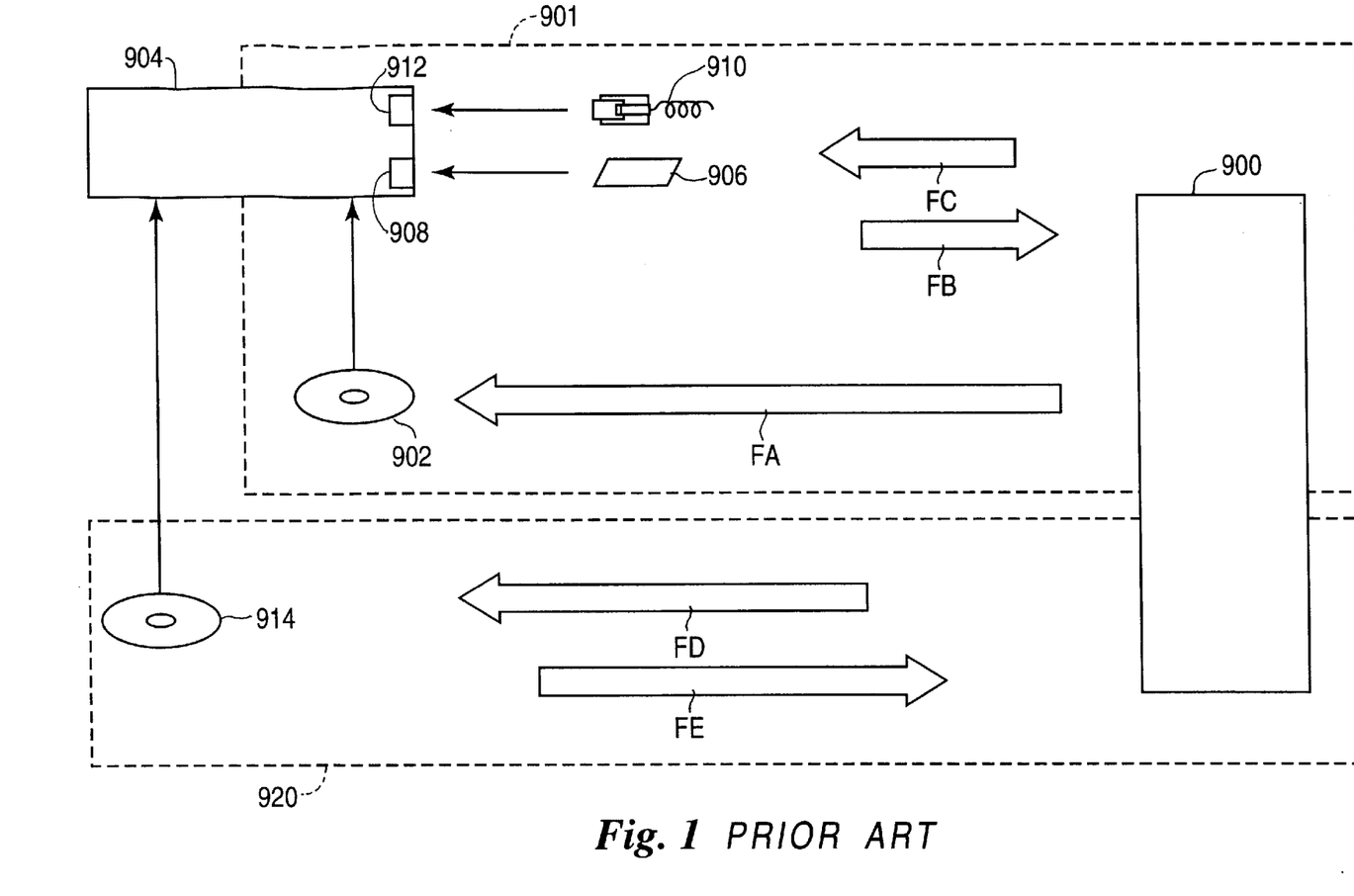
FIG. 1 shows an example of a "super distribution system" which is a conceivable system.

In FIG. 1, an example of such "super distribution system" is depicted. The "super distribution system" 901 utilizes a DVD (Digital Video Disc or Digital Versatile Disc) in FIG. 1. A software supplier 900 supplies a DVD disc 902 at a low price as indicated by an arrow FA, wherein information recorded in the DVD disc 902 which is adapted to the "super distribution system" 901 are ciphered. The software supplier 900 includes retailers and credit card issuing companies. On the other hand, a DVD player 904 which is designed for the "super distribution system" 901 is equipped with an IC (Integrated Circuit) card slot 908 to be loaded with an IC card 906 and a communication port 912 for connecting a telephone line 910. In the IC card 906, data of credited amount for reproducing information are prestored and the data are amended at each time when the information are reproduced so as to deduct the credited amount. The communication port 912 is connected to a host computer of the software supplier 900 through the telephone line 910, wherein data of reproduction fees of DVD discs are collected as indicated by an arrow FB and data of a revised credited amount responsive to the reproduction is newly set in the IC card 906 as indicated by an arrow FC. The software supplier 900 will charge to the user in accordance with the collected data of reproduction fees of DVD discs. In addition thereto, in a regular distribution system 920, the software supplier 900 supplies a regular type DVD disc 914 as indicated by an arrow FD and collects a fee for the sold DVD disc 914 as indicated by an arrow FE.

In the "super distribution system", an amount of actually utilized information out of total information contained in a package medium such as a DVD disc is accurately obtained and reproduction fee of the disc can be surely collected. The disc 902 can be sold without adding an estimated cost for full utilization of the information like the aforementioned rental fee. Therefore, an initial purchasing cost of the disc 902 for the user becomes very low since a disc itself is manufactured at an extremely low cost. In addition thereto, a reasonable charging system, which is fair to and is understandable for a user, can be realized so that the user is charged depending on a volume of actually utilized information. Information not reproduced are not charged to the user even in the middle of its reproduction. For example, the user may interrupt the reproduction of the information in the middle when the user finds the content of the information not satisfactory, the interrupted information is not charged to the user.

However, such a "super distribution system" involves a large-scale data transmission and computing system since a utilization state of the content of information and the information for limiting a utilization of the content of information and the like are required to be exchanged through a communication network. Furthermore, in the conceivable "super distribution system", there is not provided a definite criteria for indicating amount of utilization of information, procedure or method of knowing volume of utilized information.

SUMMARY OF THE INVENTION

Accordingly, an object of the present invention is to provide a managing system of charging reproduction fee in response to a utilized degree of information without any large-scale network when information contained in recording mediums, especially in discs are reproduced. Another object of the present invention is to prevent information from illegal utilization of reproduction or to prevent recording mediums from counterfeit manufacturing.

In order to achieve the above objects, the present invention provides, according to an aspect thereof, a managing system for reproducing information which comprises information recording medium recorded with software information to be reproduced and a reproduction managing information inherent to the recording medium and necessary to manage reproduction of the software information. The managing system for reproducing information further comprises a managing medium recorded with a reproduction permitting information for reproducing the software information, a reproduction device for reproducing the software information, a first readout device for reading out the reproduction managing information, a second readout device for reading out the reproduction permitting information, a reproduction judging device for judging whether reproduction of the software information is permitted or not in conjunction with the reproduction managing information read out by the first readout device and the reproduction permitting information read out by the second readout device, a detecting device of utilization information for detecting a utilization state of the software information as a software utilization information in the reproduction device, and a writing device for writing the software utilization information detected by the detecting device of utilization information into the managing medium.

According to a main configuration of the present invention, reproduction time information of the software information, a number of divided sections of the reproduced software information, a number of judging points at where reproduction of the software information is judged, and a charging information calculated from a degree of software utilization, are defined as the software utilization information. Other configurations provide an indicating device for indicating an amount of reproduction fee to be charged, which is calculated from the charging information. The other configurations further provide a disc as the information recording medium, in which the reproduction managing information is recorded in lower recording density than that of the software information.

According to one aspect of the present invention, a new information recording medium is provided. The information recording medium is utilized for a managing system for reproducing information, wherein a reproduction managing information needed to manage reproduction of a software information to be reproduced and a reproduction permitting information are read out from the medium, and wherein the software information is reproduced after judging whether the reproduction of the software information is permitted or not and then a utilization state of the software information is detected. Further, the information recording medium is recorded with the software information and the reproduction managing information.

According to another aspect of the present invention, a managing medium is provided. The managing medium is utilized for a managing system for reproducing information, wherein a reproduction managing information necessary to manage reproduction of software information to be reproduced and a reproduction permitting information are read out from the medium, and wherein the software information is reproduced after judging whether the reproduction of the software information is permitted or not and then a utilization state of the software information is detected. Further, the managing medium is recorded with the reproduction permitting information and the software utilization information.

According to another aspect of the present invention, a reproduction apparatus is provided. The reproduction apparatus is utilized for a managing system for reproducing information. In the managing system for reproducing information, a reproduction managing information is read out from an information recording medium wherein the information recording medium is recorded with software information to be reproduced and the reproduction managing information necessary to manage reproduction of the software information and inherent to the information recording medium, and wherein a reproduction permitting information is read out from a managing medium recorded with the reproduction permitting information which is necessary to reproduce the software information, the software information is reproduced after judging whether the reproduction of the software information is permitted or not, and a utilization state of the software information is detected, then the utilization state of the software information is recorded in the managing medium. The reproduction apparatus comprises a reproduction device for reproducing the software information, a first readout device for reading out the reproduction managing information from the information recording medium, a second readout device for reading out the reproduction permitting information from the managing medium, a reproduction judging device for judging whether the reproduction of the software information is permitted or not in the reproduction device in response to the reproduction managing information read out by the first readout device and the reproduction permitting information read out by the second readout device, a detection device of utilization information for detecting a utilization state of the software information in the reproduction device as the software utilization information, and a writing device for writing the software utilization information detected by the detection device of utilization information into the managing medium.

In more specific aspect of the present invention, there provided a reproduction method that is utilized for a managing system for reproducing information. In the managing system for reproducing information, a reproduction managing information is read out from an information recording medium wherein the information recording medium is recorded with a software information to be reproduced and the reproduction managing information which is necessary to manage reproduction of the software information and is inherent to the information recording medium, a reproduction permitting information is read out from a managing medium wherein the managing medium is recorded with the reproduction permitting information which is necessary to reproduce the software information, the software information is reproduced after judging whether the reproduction of the software information is permitted or not, a utilization state of the software information is detected, and then the utilization state of the software information is recorded in the managing medium. The reproduction method comprises a first readout step of reading out the reproduction managing information from the information recording medium, a second readout step of reading out the reproduction permitting information from the managing medium, a reproduction judging step of judging whether the reproduction of the software information is permitted or not in the reproduction step in response to the reproduction managing information read out in the first readout step and the reproduction permitting information read out in the second readout step, a reproduction step of reproducing the software information from the package medium, a detection step of detecting a utilization state of the software information as the software utilization information, and a writing step of writing the software utilization information into the managing medium.

In addition thereto, in the information recording medium, or in the managing medium, or in the reproduction apparatus, or in the reproduction method mentioned above is a reproduction time information of the software information. Further, in the information recording medium, or in the managing medium, or in the reproduction apparatus, or in the reproduction method mentioned above, the software information in the information recording medium is divided into plural sections and the software utilization information is a number of the divided sections. Furthermore, in the information recording medium, or in the managing medium, or in the reproduction apparatus, or in the reproduction method mentioned above, the software information is provided with a plurality of judging points for judging a reproduction and the software utilization information is a number of judging points for judging the reproduction. Moreover, in the information recording medium, or in the managing medium, or in the reproduction apparatus, or in the reproduction method mentioned above, the software utilization information is a charging information of reproduction fee, which is calculated in response to the software utilization information. An indicating device is provided in the reproduction apparatus for indicating an amount of reproduction fee to be charged to a user in accordance with the charging information recorded in the managing medium. The managing medium is an IC card. In addition thereto, the information recording medium and the managing medium utilized in the reproduction apparatus and the reproduction method mentioned above are a disc and an IC card respectively.

Other objects and further features of the present invention will be apparent from the following detailed description with respect to the preferred embodiment of the present invention when read in conjunction with the accompanying drawings.

DETAILED DESCRIPTION OF THE PREFERRED EMBODIMENTS

Embodiment

Figure 2A:
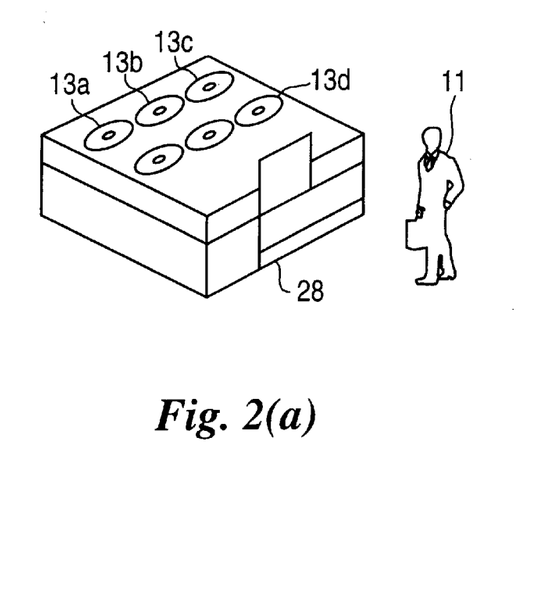
FIG. 2(a) shows a rental shop arrangement as a part of a managing system for reproducing information according to an embodiment of the present invention.

FIG. 2(a) shows a rental shop arrangement as a part of a managing system for reproducing information according to an embodiment of the present invention.

Figure 2B:
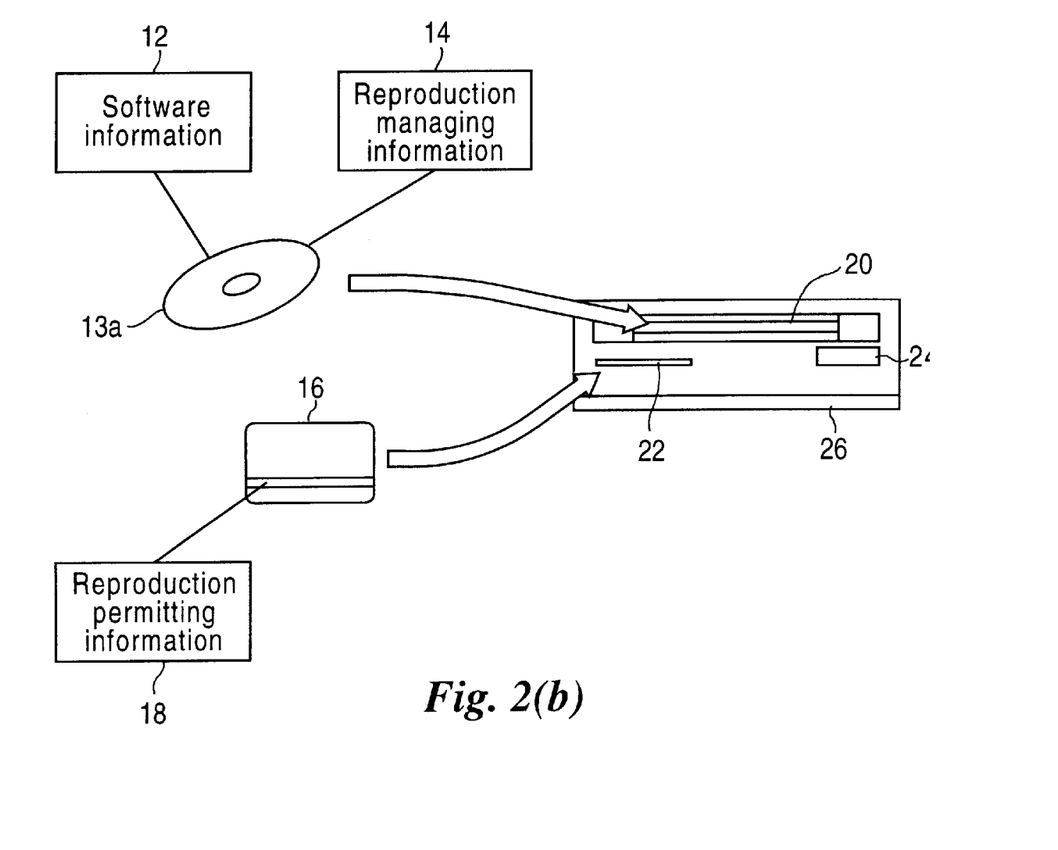
FIG. 2(b) shows a managing system for reproducing information according to the embodiment of the present invention.

FIG. 2(b) shows a managing system for reproducing information according to the embodiment of the present invention.

Figure 2C:
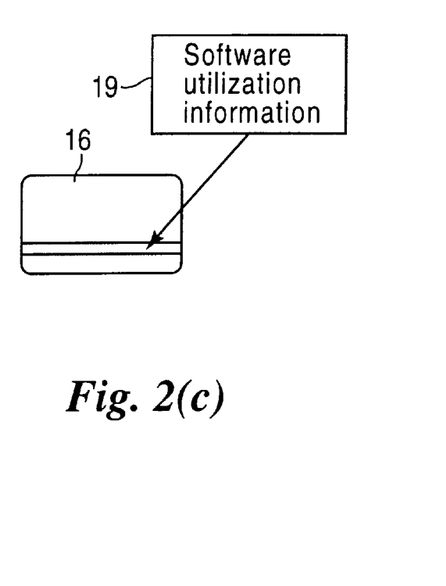
FIG. 2(c) shows a membership card as one of exemplary managing mediums of permitting reproduction of information in the managing system for reproducing information according to the embodiment of the present invention.

FIG. 2(c) shows a membership card as one of exemplary managing mediums of permitting reproduction of information in the managing system for reproducing information according to the embodiment of the present invention.

Figure 3:
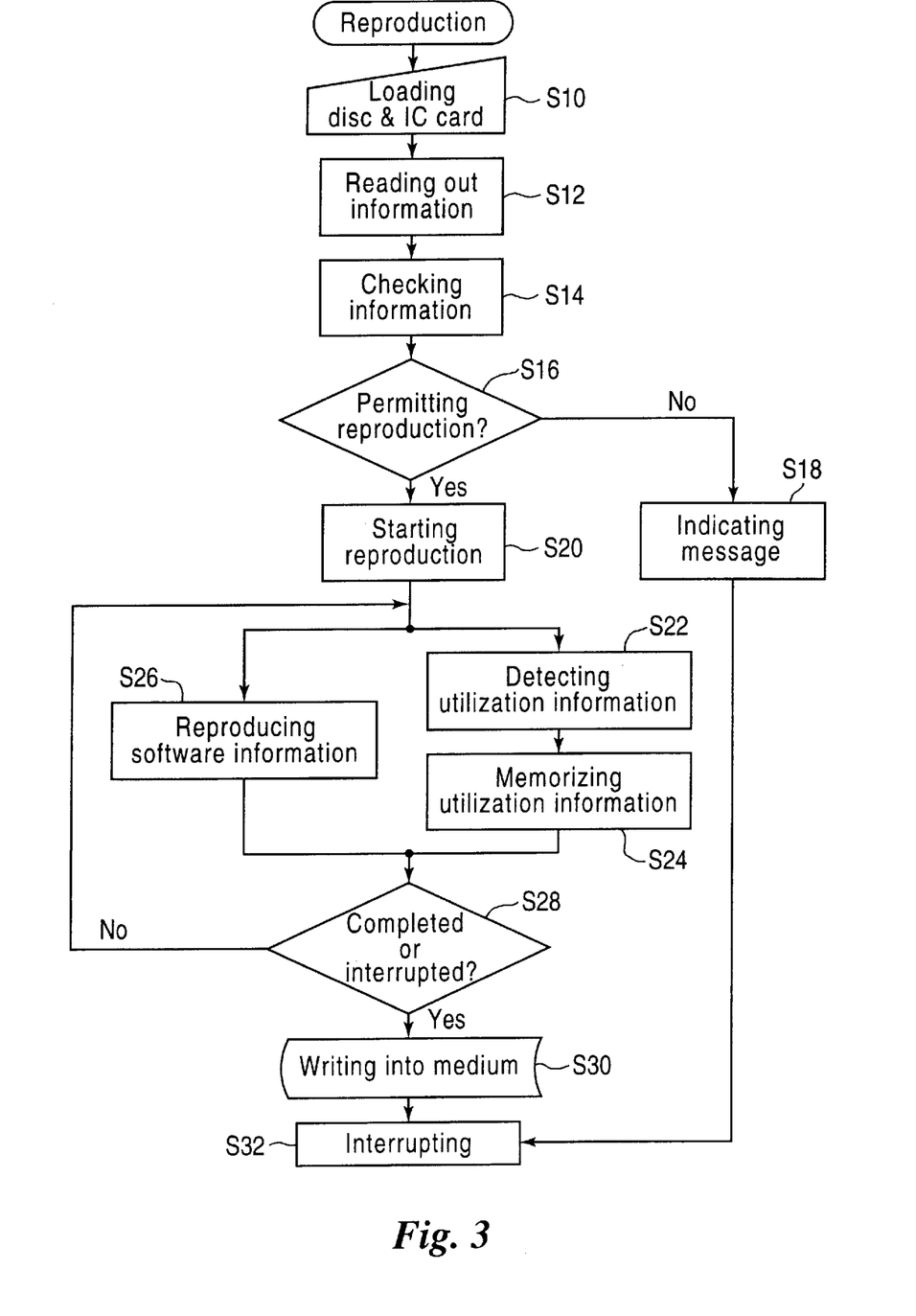
FIG. 3 shows a flow chart of reproduction process according to the embodiment of the present invention.

FIG. 3 is a flow chart of reproduction process according to the embodiment of the present invention.

Figure 4:
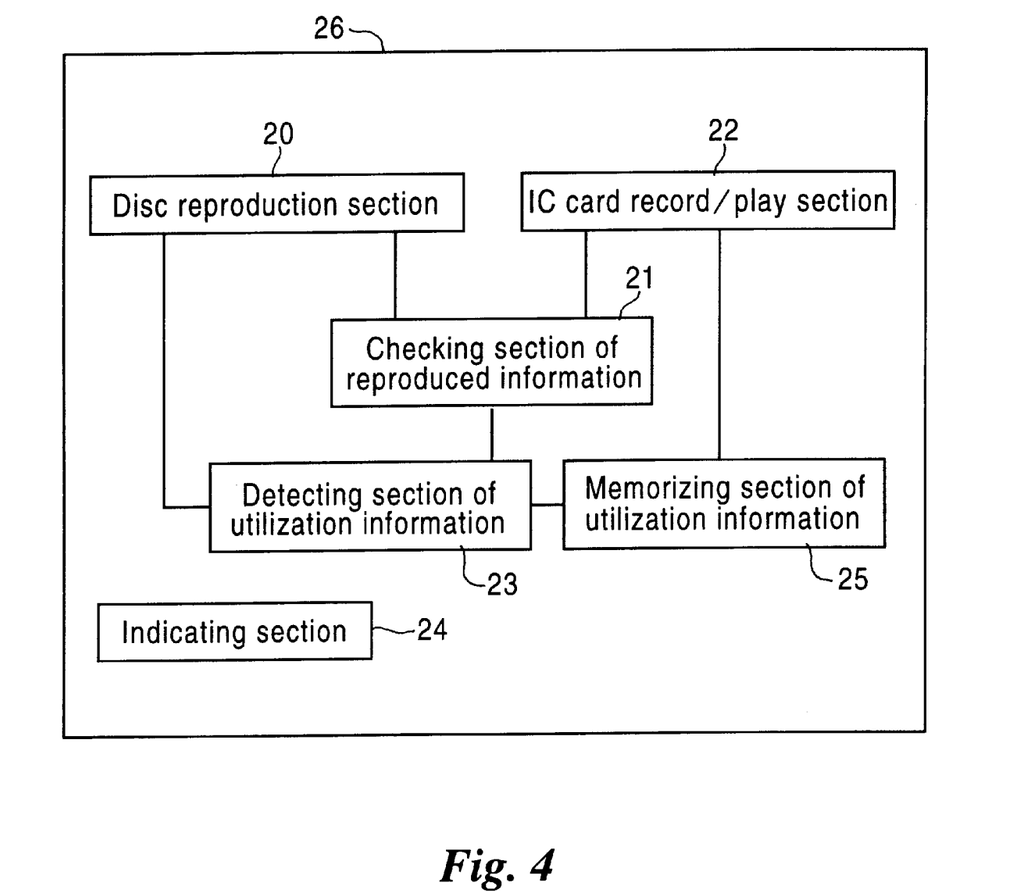
FIG. 4 shows a block diagram of a reproduction apparatus according to the embodiment of the present invention.

FIG. 4 is a block diagram of a reproduction apparatus according to the embodiment of the present invention.

In FIGS. 2(a), 2(b) and 2(c), a managing system for reproducing information is depicted. The managing system is exemplary applied to a rental system of DVD (Digital Video Disc or Digital Versatile Disc) discs in a rental shop. As shown in FIGS. 2(a) and 2(b), a user 11 visits a rental shop 28 and chooses a disc 13a out of plural discs 13a through 13d, wherein the disc 13a contains software information 12 which is preferred to view by the user 11 and the disc 13a is recorded with a reproduction managing information 14 which is inherent to each disc. The reproduction managing information 14 contains, for example, a title identification (ID) of recorded information and a serial number of the disc. In case of a DVD disc, a BCA (Burst Cutting Area) signal is recorded in an innermost area of the disc with a lower recording density than that of primary software information in the disc and the BCA signal can be utilized for the reproduction managing information 14. The BCA signal is recorded in each disc as a form of bar code and contents of the bar code are made difficult to be recognized at a glance. Therefore, a BCA signal is suitable for a recording method of the reproduction managing information 14.

An IC (Integrated Circuit) card (membership card) 16 recorded with a reproduction permitting information 18 is handed to the user 11 as one of managing mediums for reproduction permission together with the disc 13a to rent. The IC card 16 can be utilized as the membership card for reproduction permission. The IC card 16 may be repeatedly used by rewriting the reproduction permitting information at each time of renting the disc 13a when the IC card 16 is issued as the membership card, which verifies the user 11 as an authorized member of the rental shop 28. The reproduction permitting information 18 contains a user-related information, which indicates the user 11 as a proper user of the disc 13a, a disc-related information including the title ID and a serial number of the disc 13a, and information about a rental term.

A fee for utilization of the software information is not charged to the user 11 at a time of renting the disc 13a. Only a rental commission and a deposit for the disc 13a are charged. A plurality of reproduction permitting information 18 is recorded in one IC card 16 when plural discs are lent out. Generally, one IC card 16 is capable of recording plural reproduction permitting information 18 since a memory capacity of an IC card is sufficiently large. One IC card 16 can be recorded with a plurality of reproduction permitting information 18 for plural discs though about 512 bytes of memory capacity, for example, is necessary for such a reproduction permitting information 18.

In FIGS. 3 and 4, an information reproduction method for reproducing software information is depicted. As shown in FIGS. 2(b) and 4, a reproduction apparatus 26 comprises a disc reproduction section 20, a checking section 21 of reproduced information, an IC card record/play section 22, a detecting section 23 of utilization information, an indicating section 24, and a memorizing section 25 of utilization information, wherein the IC card record/play section 22 can be connected to the reproduction apparatus 26 as an external peripheral equipment (not shown) through an adapter (not shown) instead of a built-in section of the reproduction apparatus 26. The user 11 brings the disc 13a and the IC card 16 back to his house and loads them into the reproduction apparatus 26 (step S10 in FIG. 3). In other words, the disc 13a is inserted into the disc reproduction section 20 and the IC card 16 is inserted into the IC card record/play section 22 respectively.

The reproduction apparatus 26 reads out the reproduction managing information 14 from the disc 13a and the reproduction permitting information 18 from the IC card 16 respectively (step S12 in FIG. 3). Actually, the disc reproduction section 20 reproduces the reproduction managing information 14 and the IC card record/play section 22 plays back the reproduction managing information 14. The checking section 21 of reproduced information checks two kind of information 14 and 18 (step S14 in FIG. 3), these information 14 and 18 are read out in the step S12 in FIG. 3, and judges whether the reproduction of the software information is permitted or not (step S16 in FIG. 3). Information of time and date (year, month, and day) which are provided for the reproduction apparatus 26 are referred when judging.

In case that only the disc 13a is loaded without loading the IC card 16, or in case that the disc 13a is reproduced while a rental term recorded in the IC card 16 is overdue although the disc 13a and the IC card 16 are properly loaded, or in case that a software information beyond a limit specified in the utilization information recorded in the IC card 16 is attempted to reproduce, reproduction is not permitted. In these cases, the indicating section 24 indicates a message such as "This disc can not be reproduced by your IC card." or "The rental term of this disc is overdue, return the disc." (step S18 in FIG. 3) and the reproduction is interrupted (step S32 in FIG. 3).

In case that the reproduction is permitted at "Yes" of the step S16 in FIG. 3, the disc reproduction section 20 reproduces the software information 12 of the disc 13a (steps S20 and S26 in FIG. 3). During the reproduction, the detecting section 23 of utilization information detects a utilization information (step S22 in FIG. 3) and the memorizing section 25 of utilization information memorizes the utilization information (step S24 in FIG. 3).

Following three methods (1) through (3), for example, are considered as detecting methods of a utilization information. A software producer can arbitrarily assign a method of how to charge reproduction fees. It is designated by the reproduction managing information 14 and the reproduction permitting information 18 that which of the detecting methods shall be utilized.

(1) A utilization information is defined as a time duration of reproducing software information by a user. A reproduction time itself can be defined as a utilization information. Information in response to the reproduction time can also be defined as a utilization information with dividing or grading the information into several duration such as, for example, within one hour, within one hour and a half, or more than two hours.

(2) Information such as a number of reproduction chapters or a number of divided sections of information in one software are defined as a utilization information. The number of divided sections itself can be defined as a utilization information. Information in response to the number of reproduction chapters can also be defined as a utilization information with dividing or grading the information into several steps such as, for example, from one to 10, from 11 to 20, or more than 21.

(3) Frequency of detection of specific points in a software information reproduced by a user is defined as a utilization information, wherein the specific points are detected upon they are reproduced. Such a specific point can be arbitrarily assigned, for example, it is counted as one when a specific scene has been reproduced by a user, or a detection count is incremented when a specific point is reproduced by a user, wherein plural specific points may be distributed over an entirety of software information. In addition thereto, there provided several methods of assigning a specific point, for example, a method of recording a signal indicating a specific point into a reserved area of a sector ID and detecting the signal responsive to an instruction provided in the IC card 16, or a method of recording a specific point assigned by a chapter number or a sector number into the reproduction managing information 14 and detecting the assigned specific point which has been reproduced responsive to an instruction provided in the IC card 16.

Referring back to FIG. 3, the reproduction of the software information in the step S26 will be stopped when the reproduction of the software information is completed or the user operates to interrupt the reproduction ("Yes" of the step S28). The utilization information is recorded into the IC card 16, as shown in FIG. 2(c), in the IC card record/play section 22 at the time when the reproduction is completed or interrupted (step S30). The reproduction is finally interrupted (step S32).

In a case of returning the disc 13a to the rental shop 28, the user brings the disc 13a together with the IC card 16 to the rental shop 28. In the rental shop 28, the utilization information 19 recorded in the above mentioned step S30 is read out from the IC card 16 which is returned from the user 11 and a total amount of reproduction fees to be charged is calculated from the utilization information 19.

According to the embodiment of the present invention, following effects (1) and (2) are expected.

(1) In case of reproducing information recorded in mediums especially in discs, information can be protected from illegal duplication or copy. In addition thereto, a utilization fee for reproduction can be collected in response to an amount of utilization of information recorded in a disc without depending on a large-scale infrastructure such as a network.

(2) A return rate of disc (degree of returning rented discs to the shop) is improved, because a disc can not be reproduced after the due date for return. Even in case that a disc is not returned, the disc can not be reproduced any more unless the reproduction permitting information 18 is renewed. Therefore, the disc can not be reproduced without a payment. Such a non-returned disc can be compensated by a small amount of deposit. Furthermore, a rental shop can stock a large quantity of identical discs so as to deal with a plurality of users of requesting the same disc since a disc itself is in very low cost and a package of a disc is small enough for a large inventory.

While the present invention has been described as above with reference to the specific embodiment thereof, it is apparent that many changes, modifications and variations in the arrangement of equipment and devices can be made without departing from the inventive concept disclosed herein. For example, following variations (1) through (4) are included.

(1) As to the reproduction permitting information 18 and the reproduction managing information 14, the simplest configuration is disclosed above. More complicated configurations can be adopted for the reproduction permitting information 18 and the reproduction managing information 14. For example, the disc 13a becomes more protective for an illegal utilization, if the software information 12 is ciphered and the reproduction permitting information 18 is modified in connection with a deciphering key and the reproduction managing information 14 which is inherent to the disc 13a. Or in other example, if the reproduction permitting information 18 is produced in accordance with the predetermined operation such as processing the reproduction managing information 14 and the deciphering key, the reproduction permitting information 18 used for producing the deciphering key becomes inherent to each disc since the reproduction managing information 14 varies disc by disc. Accordingly, other discs can not be reproduced, if the same reproduction permitting information 18 is applied to other discs than a specific disc. In addition thereto, it is hard to decipher the ciphered software information 12 since there are extreme numbers of operation method.

(2) The present invention disclosed above is most suitable for disc mediums such as DVD discs. However, any media can be applicable if the mediums are adapted to a system in which a limitation of reproduction can be released by reproduction permission. In a case of a DVD disc, a BCA (Burst Cutting Area) is a most preferable area for recording the information inherent to the disc such as a disc ID.

(3) In the embodiment disclosed above, the software utilization information 19 is recorded into the IC card 16 after the reproduction is completed or interrupted. However, it is possible to rewrite the software utilization information 19 of the IC card 16 at anytime during reproduction. Regarding the software utilization information 19 to be recorded, a charging information of reproduction fee calculated in response to the above mentioned information can be recorded. The indicating section 24 of the reproduction apparatus 26 or a display which indicates the software information is beneficial for a user to prevent the user from monetary trouble when returning a disc, as the indicator or the display indicates the utilization information or a charging information of reproduction fee so that the user is informed of what he is paying for. Furthermore, an information record/play card with an information displaying section is preferable to be used as a managing medium, the card can indicate the software utilization information 19 or the charging information of reproduction fee in the display section immediately before the card is removed from a card recorder/player.

(4) In the above-mentioned embodiment, an IC card is used for as a managing medium for reproduction permission. Any medium can be used as a managing medium, if the reproduction permitting information 18 and the software utilization information 19 in the medium can be rewritten magnetically or electronically.

According to the present invention, following merits are assured.

(1) It is possible to charge reproduction fees accurately in response to utilization states without having a large-scale network system when information recorded in recording mediums, especially, such as discs are reproduced.

(2) It is possible to protect information from illegal utilization or duplication.

What is claimed is:

1. A managing system for reproducing information comprising:

an information recording medium recorded with a software information to be reproduced and a serial number as a reproduction managing information, wherein said reproduction managing information is utilized for managing reproduction of said software information and is inherent to said information recording medium;

a managing medium recorded with a reproduction permitting information for reproducing said software information;

reproduction means for reproducing said software information;

first readout means for reading out said reproduction managing information from said information recording media;

second readout means for reading out said reproduction permitting information from said managing medium;

reproduction judging means for judging whether reproduction of said software information is permitted or not in said reproduction means in response to said reproduction managing information and said reproduction permitting information read out by said first and second readout means respectively;

detection means for detecting a utilization state of said software utilization information; and writing means for writing said software utilization information detected by said detection means into said managing media.

2. A managing system for reproducing information in accordance with claim 1, wherein said software utilization information is a reproduction time of said software information performed by a user.

3. A managing system for reproducing information in accordance with claim 2, wherein said information recording medium is a disc and said disc is recorded with said reproduction managing information in lower recording density than that of said software information.

4. A managing system for reproducing information in accordance with claim 1, wherein said software utilization information is divided into a plurality of sections and said software utilization information is a number of divided sections which are reproduced by a user.

5. A managing system for reproducing information in accordance with claim 4, wherein said information recording medium is a disc and said disc is recorded with said reproduction managing information in lower recording density than that of said software information.

6. A managing system for reproducing information in accordance with claim 1, wherein said software information is provided with a plurality of judging points for reproduction and said software utilization information is a number of said judging points for reproduction which are reproduced by a user.

7. A managing system for reproducing information in accordance with claim 6, wherein said information recording medium is a disc and said disc is recorded with said reproduction managing information in lower recording density than that of said software information.

8. A managing system for reproducing information in accordance with claim 1, wherein said software utilization information is a charging information of reproduction fee which is calculated in response to said software utilization information.

9. A managing system for reproducing information in accordance with claim 8, wherein said managing system for reproducing information is equipped with indicating means for indicating an amount of reproduction fee to be charged and said charging information of reproduction fee.

10. A managing system for reproducing information in accordance with claim 8, wherein said information recording medium is a disc and said disc is recorded with said reproduction managing information in lower recording density than that of said software information.

11. A managing system for reproducing information in accordance with claim 9, wherein said information recording medium is a disc and said disc is recorded with said reproduction managing information in lower recording density than that of said software information.

12. A managing system for reproducing information in accordance with claim 1, wherein said information recording medium is a disc and said disc is recorded with said reproduction managing information in lower recording density than that of said software information.

13. An information recording medium utilized for a managing system for reproducing information being recorded with a software information and a serial number as a reproduction managing information, wherein respective said reproduction managing information being inherent to said information recording medium and a reproduction permitting information necessary to manage reproduction of said software information to be reproduced, are read out, and wherein said software information is reproduced after judging whether reproduction of said software information is permitted or not and then a utilization state of said software information is detected as a software utilization information.

14. A managing medium utilized for a managing system for reproducing information being recorded with a software information and a serial number as a reproduction managing information, wherein respective said reproduction managing information being inherent to said information recording medium and a reproduction permitting information necessary to manage reproduction of said software information to be reproduced, are read out, and wherein said software information is reproduced after judging whether reproduction of said software information is permitted or not and then a utilization state of said software information is detected as a software utilization information.

15. A reproduction apparatus utilized for a managing system for reproducing information, wherein a serial number as a reproduction managing information is read out from an information recording medium recorded with a software information to be reproduced and said reproduction managing information, and wherein said reproduction managing information is necessary to manage reproduction of said software information and is inherent to said information recording medium, and wherein a reproduction permitting information for reproducing said software information is read out from a managing medium recorded with said reproduction permitting information, and wherein said software information is reproduced after judging whether reproduction of said software information is permitted or not, and wherein a utilization state of said software information is detected as a software utilization information and said software utilization information is written into said managing medium, said reproduction apparatus comprising:

reproduction means for reproducing said software information;

first readout means for reading out said reproduction managing information from said information recording medium;

second readout means for reading out said reproduction permitting information from said managing medium;

reproduction judging means for judging whether reproduction of said software information is permitted or not in said reproduction means in response to said reproduction managing information and said reproduction permitting information read out by said first and second reproduction means respectively;

utilization information detecting means for detecting a utilization state of said software information in said reproduction means as said software utilization information; and writing means for writing said software utilization information detected by said utilization information detecting means into said managing media.

16. A reproduction method which is utilized for a managing system for reproducing information, wherein a serial number as a reproduction managing information is read out from an information recording medium recorded with a software information to be reproduced and said reproduction managing information, and wherein said reproduction managing information is necessary to manage reproduction of said software information and is inherent to said information recording medium, and wherein a reproduction permitting information for reproducing said software information is read out from a managing medium recorded with said reproduction permitting information, and wherein said software information is reproduced after judging whether reproduction of said software information is permitted or not, and wherein a utilization state of said software information is detected as a software utilization information and said software utilization information is written into said managing medium, said reproduction method comprising:

a first readout step of reading out said reproduction managing information from said information recording medium;

a second readout step of reading out said reproduction permitting information from said managing medium;

a reproduction judging step of judging whether reproduction of said software information is permitted or not in a reproduction step in response to said reproduction managing information and said reproduction permitting information read out by said first and second reproduction steps respectively;

a reproduction step of reproducing said software information;

a utilization information detecting step of detecting a utilization state of said software information as said software utilization information; and a writing step of writing said software utilization information into said managing media.

* * * * *